(12) United States Patent
Rose-Petruck et al.

(10) Patent No.: US 10,833,374 B2
(45) Date of Patent: Nov. 10, 2020

(54) IN-SITU X-RAY SCATTER IMAGING OF BATTERY ELECTRODES

(71) Applicant: Brown University, Providence, RI (US)

(72) Inventors: Christoph Rose-Petruck, Providence, RI (US); Brian Sheldon, Brookline, MA (US); Alexandra Stephan, Providence, RI (US); Ravi Kumar, Providence, RI (US); Francicso Schunk, Providence, RI (US)

(73) Assignee: BROWN UNIVERSITY, Providence, RI (US)

( * ) Notice: Subject to any disclaimer, the term of this patent is extended or adjusted under 35 U.S.C. 154(b) by 355 days.

(21) Appl. No.: 15/803,458

(22) Filed: Nov. 3, 2017

(65) Prior Publication Data
US 2018/0131044 A1 May 10, 2018

Related U.S. Application Data

(60) Provisional application No. 62/417,736, filed on Nov. 4, 2016.

(51) Int. Cl.
*H01M 10/42* (2006.01)
*G01N 23/20025* (2018.01)
*G01N 23/201* (2018.01)
*G01N 23/207* (2018.01)

(52) U.S. Cl.
CPC ...... *H01M 10/4285* (2013.01); *G01N 23/201* (2013.01); *G01N 23/20025* (2013.01); *G01N 23/2076* (2013.01)

(58) Field of Classification Search
None
See application file for complete search history.

(56) References Cited

U.S. PATENT DOCUMENTS

| | | | |
|---|---|---|---|
| 5,635,138 A | 6/1997 | Amatucci et al. | |
| 7,022,290 B2 | 4/2006 | Gural et al. | |
| 7,550,737 B1 | 6/2009 | Ballard et al. | |
| 2014/0272543 A1* | 9/2014 | Devan ............ | H01M 10/0436 429/162 |
| 2015/0297756 A1* | 10/2015 | Rose-Petruck .... | A61K 49/0461 600/431 |

OTHER PUBLICATIONS

Itou, M., "Compton scattering imaging of a working battery using synchrotron high-energy X-rays", J Synchrotron Radiat. Jan. 2015;22(1):161-4.

* cited by examiner

*Primary Examiner* — Edwin C Gunberg
(74) *Attorney, Agent, or Firm* — Adler Pollock & Sheehan P.C.

(57) ABSTRACT

A method and apparatus for in-situ x-ray scatter imaging of battery electrodes. An apparatus includes an X-ray source, a grid, the grid comprising stainless steel wires with uniform spacing, and a cell, the X-ray source directing a beam of energy through the metal grid and components of the cell, the cell blurring a previously sharp projection of grid wires on an image detector. A method includes providing a Spatial Frequency Heterodyne Imaging system, providing a grid, providing a cell, generating X-rays from the Spatial Frequency Heterodyne Imaging system that pass through components of the cell and the grid, and detecting a scatter image from the X-rays.

2 Claims, 2 Drawing Sheets

100

Provide a Spatial Frequency
Heterodyne Imaging system
110

Provide a grid
120

Provide a cell
130

Generate X-rays from the Spatial
Frequency Heterodyne Imaging
system that pass through components
of the cell and the grid
140

Detect a scatter image
from the X-rays
150

FIG. 2

IN-SITU X-RAY SCATTER IMAGING OF BATTERY ELECTRODES

CROSS REFERENCE TO RELATED APPLICATIONS

This application claims benefit from U.S. Provisional Patent Application Ser. No. 62/417,736, filed Nov. 4, 2016, which is incorporated by reference in its entirety.

STATEMENT REGARDING GOVERNMENT INTEREST

This Invention was made with government support under grant number DE-FG02-08ER15937 awarded by the Department of Energy. The government has certain rights in the invention.

BACKGROUND OF THE INVENTION

The invention generally relates batteries, and more specifically to in-situ x-ray scatter imaging of battery electrodes.

A running lithium-ion battery is a black box. Researchers open it to check the state of the materials inside during charging or discharging, or after a series of cycles. But this gives just a glimpse of the story. Electrochemical processes evolve quickly, and many products of the reactions break down in air, or even in inert gases (such as argon). Some of these products react with oxygen or carbon dioxide. So opening the box might alter the composition of the materials within it.

More specifically, one of the major issues in designing batteries with high density is that most high energy density electrode materials change with repeated cycling, which causes the charge capacity to decrease with time. Consequently, a focus of battery research is on studying these changes and subsequently designing electrodes that do not lose charge capacity. A difficulty with studying electrode changes originates from the electrode in a functioning battery being encased. Most current methods used to study electrodes such as tunneling electron microscopy (TEM), scanning electron microscopy (SEM), atomic force microscopy (AFM) and X-Ray diffraction (XRD) require the battery to be disassembled. Disassembling the battery modifies the electrode, which means that the same electrode can no longer be further cycled.

Electrochemical processes need to be tracked while the system is closed.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for mobile application development and deployment.

In general, in one aspect, the invention features an apparatus including an X-ray source, a grid, the grid comprising stainless steel wires with uniform spacing, and a cell, the X-ray source directing a beam of energy through the metal grid and components of the cell, the cell blurring a previously sharp projection of grid wires on an image detector.

In another aspect, the invention features a method including providing a Spatial Frequency Heterodyne Imaging system, providing a grid, providing a cell, generating X-rays from the Spatial Frequency Heterodyne Imaging system that pass through components of the cell and the grid, and detecting a scatter image from the X-rays.

Embodiments of the invention may have one or more of the following advantages.

The present invention enables the study of electrode homogeneity and deformation inside assembled batteries.

Using the present invention enables one to simultaneously view the entire electrode rather than just a small subsection, such as occurs, for example, in X-ray scattering measurements at synchrotrons.

Methods of the present invention are completely non-destructive because the battery does not have to be disassembled in any way.

The present invention is relatively simple because it require only a polychromatic X-ray source, a stainless steel grid and a detector.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

FIG. 2 is flow diagram.

DETAILED DESCRIPTION

Figure 1:
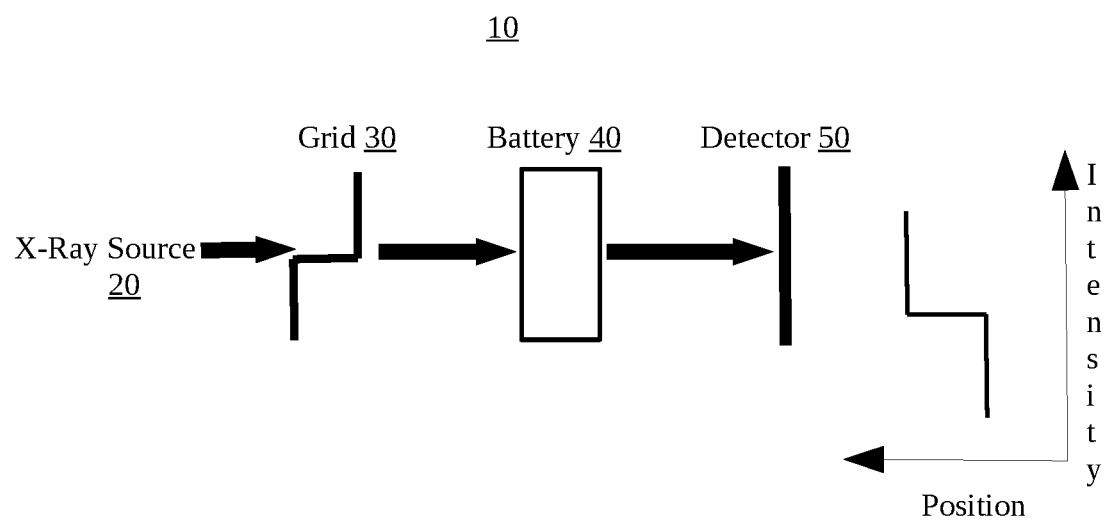
FIG. 1 is a block diagram of an exemplary X-Ray scatter imaging system.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Improvements to Li-ion battery performance have been limited by the current techniques used to study these batteries. With the present invention, X-ray scatter images are taken without the use of a synchrotron, which affords for a comprehensive measurement of the changes that the battery's anode undergoes during cycling. X-rays penetrate through a stainless steel casing of a Li-ion coin cell. Therefore, the cell is not disassembled or modified for measurements, providing true insight into the anode's behavior. The entire electrode is imaged in a single exposure. A movie of the electrode's scatter evolution is created by capturing continuous images. Using this technique, the inhomogeneities of Solid Electrolyte Interphase (SEI) formation and lithiation, the determining factors of high and low capacity cells, and the size and density evolution of Si nanoparticles are observed. These significant insights enable the development of higher performance and safer Li-ion batteries with Si nanoparticle anodes.

In the present invention, Spatial Frequency Heterodyne Imaging (SFHI) is used, an X-ray imaging modality with a large field of view that can image an entire battery during one exposure. In addition to a conventional X-ray absorption image, it measures the amount of small-angle X-ray scattering in each image point, a feature that is sensitive to changes on the nanoscale and mesoscale of the imaged object. These are the size scales of the changes that Si nanoparticles undergo during cycling. As a result, operando images of cells can be acquired that show the changes in nanoparticles across the entire anode. SFHI is also sensitive to the nanoparticles' density changes, which result from the formation of the SEI and the lithiation of silicon nanoparticles. Furthermore, using hard X-rays to probe the Si nanoparticle behavior and SEI formation during cycling is promising because X-rays can penetrate through the stainless steel casing that contains a Li-ion cell. We observe the SEI inhomogenously forming over the entire electrode and the impact that SEI formation has on battery performance. Also, the present invention is able to track the evolution in the size and density of the nanoparticles during cycling.

As shown in FIG. 1, an exemplary X-Ray scatter imaging system 10 includes an X-ray source 20, a grid 30 and a detector 50. A battery 40 (also referred to as a "cell") is placed between the grid 30 and the detector 50. More specifically, the grid 30, which is constructed from stainless steel wire with uniform spacing, and the battery 40 are placed in tandem and a single exposure taken. The exposure consists of the transmitted photons as well as the scattered photons. The presence of the battery 40 in the viewing field blurs the previously sharp projection of the wires of the grid 30 on the detector 50. Then Fourier analysis methods are used to extract a measure of the wire projection blurring and consequently the radiation scattered by the battery 40.

More specifically, in a first step of the image processing, a Fourier transform of the acquired image generates a spatial frequency spectrum of the grid 30 and the object in reciprocal space. The grid 30 produces, in reciprocal space, a lattice of points located at its spatial frequency harmonics. The spatial frequency of the object, in this case the battery 40, is replicated about each harmonic. Next, the vicinity of each harmonic is inverse Fourier transformed separately. The harmonic (0,0), corresponds to spatial frequencies near a zero scatter angle, and consequently, at this harmonic the scattered radiation is not distinguishable from transmitted radiation. Therefore, the inverse transform of the (0,0) harmonic produces a traditional X-ray absorption image. X-ray scatter information can be obtained by comparing the signals of the central (0,0) harmonic to that of higher harmonics. Specifically, an image, called a scatter image, can be produced where the intensity at each point is proportional to the amount of X-ray scatter at that location. This image is generated by calculating the Fourier transforms of the (0,1) or the (1,0) harmonic and normalizing it by the (0,0) image. The amount of scattered radiation is correlated to the size of nanoparticles as well as mesoscopic changes that the system undergoes. Essentially, system 10 measures the sum of the X-rays scattered into small angles at about approximately one million image points simultaneously.

The cell is placed 1.2 m below a 12 bit remote RadEye 200 CMOS detector in a vertical imaging arrangement with a 1.6 m source to detector distance. In this specific example, the X-ray source was a True Focus X-ray tube, model TFX-3110EW with a Tungsten anode and a 10 μm focus size. The tube operated at 80 kV and 0.2 mA. The absorption grid 30 is a two dimensional 150 line per inch stainless steel wire mesh with 0.0026 inch gauge. The grid is placed directly below the cell, between the source and the cell. X-ray scatter images were taken using a 20 s exposure time. For a single image to be produced, a set of 10 images is taken and then averaged together in order to improve the signal-to-noise ratio. A set of ten images is taken every ten minutes throughout the cycling process. The error bars for the scatter plots are smaller than the width of the line.

In one example, composite electrodes were prepared with Si nanoparticles (average particle size 100 nm, 99% purity, specific surface area>80 m2/g, from MTI Corp.) as the active material, Super P carbon black (Timcal) as the conductive additive, and Sodium Alginate (Sigma-Aldrich) as the binder. The slurry was made of 300 mg of Si/carbon black/NaAlginate in a mass ratio of 60/20/20. First, the binder solution was made with 2% by mass of Na-Alginate powder. This composition was optimized to get the correct viscosity of the slurry. Si nanoparticles and carbon black were dry mixed using a mortar and pestle for 30 minutes. Then, the binder solution was added and mixed further for an additional 15 minutes. The slurry mix was then transferred to a small beaker and homogenized using a high-speed stirrer at ~500 rpm for 30 minutes. The slurry was type cast using a doctor blade onto a ~25 μm thick copper foil and dried in air at room temperature for 2 hours and then under vacuum at 100° C. for 5 hours. The Si nanoparticle composite electrodes were used as the working electrode with pure lithium metal foil as the counter electrode in CR-2032 coin cells. The coin cells were assembled using the working electrode, a counter electrode, and a Celgard separator with 1 M LiPF6 in ethylene carbonate (EC) and diethyl carbonate (DEC) (1:1 volume ratio) as the electrolyte.

Cycling was performed using a Princeton Applied Research Versa STAT3. The cell was cycled at room temperature using chronopotentiometry meaning that a constant current was applied until the cutoff voltage was read out from the cell by the potentiostat. For lithiation the cutoff voltage was 10 mV and for delithiation the cutoff voltage was 0.9 V. The current that was applied was calculated using the cell capacity C in mAA $g^{-1}$ $s_t$ so that the cell would discharge to a capacity of 1200 $mAg^{-1}$ $s_t$ at a C/20 rate. This means that it takes 20 hours of the current being applied in order for the cell to lithiate to full capacity. The X-ray images were collected as the current was being applied thus resulting in an operando measurement as opposed to in-situ measurements where the measurements are taken after a voltage is reached and the cell is allowed to reach equilibrium at this voltage. Because operando measurements do not interrupt the cycling, they provide a more accurate picture of the cell's behavior during cycling than in-situ measurements.

The scatter intensity as a function of angle for a spherical particle can be modeled by equation (1) where $q=(4\pi \sin(\theta))/\lambda$, d is the diameter of the spherical particle in meters, $\lambda$ is the average wavelength of the X-ray tube in meters, $\rho_e$ is the electron density of the particle in electrons/m3, and 0 is the scattering angle in radians. If the particles are not in vacuum, $\rho_e$ becomes $\rho_{particle}-\rho_{med}$ where $\rho_{particle}$ is the electron density of the particle and $\rho_{med}$ is the electron density of the surrounding medium.

$$I(d, \theta) = 4\pi(\rho_e)\frac{\sin\left(\frac{d}{2}q\right) - \frac{d}{2}q\cos\left(\frac{d}{2}q\right)}{q^3} \quad (1)$$

The X-ray scatter intensity I increases with the square of the nanoparticles' electron density and with approximately the square of the nanoparticles' diameter. The setup measures the integral under this curve, I, over the angular range from $\theta_{min}$ to $\theta_{max}$ for which we are sensitive, equation (2).

$$S_{measured}(d) = \int_{\theta_{min}}^{\theta_{max}} I(d, \theta)^2 \partial\theta \quad (2)$$

Using SpekCalc™ we calculated the X-ray emission spectrum of the X-ray tube and estimated an average X-ray wavelength of 42.7 pm for the system. The minimum scattering angle that the imaging system can detect was determined to be approximately $7.5\times10^{-4}$ radians, which corresponds to the number of pixels on the detector that a grid line pair occupies. The maximum detection angle for the system was calculated to be 0.042 radians, which corresponds to half the number of pixels on the detector. In order to model the core-shell nature of lithiated Si nanoparticles we used equation (3) where d is the diameter of the inner core of the particle in meters, D is the diameter of the entire particle in meters, $\mu_{Li13Si4}$ is the electron density of the $Li_{13}Si_4$ phase in electrons/m³, $\rho_{Si}$ is the electron density of crystalline Si in electrons/m³, and $\rho_{med}$ is the electron density of the medium in electrons/m³ With this equation, we calculate the scatter intensity for an entire nanoparticle composed of $Li_{13}Si_4$, subtract out the scattering intensity of the $Li_{13}Si_4$ core, and then add the scattering intensity of the Si core.

$$S_{core-shell}(d, D) = \int_{\theta_{min}}^{\theta_{max}} (I_{core} + I_{shell})^2 \partial\theta \quad (3)$$

with $$I_{core} = 4\pi(\rho_{Si} - \rho_{med})\frac{\sin\left(\frac{d}{2}q\right) - \frac{d}{2}q\cos\left(\frac{d}{2}q\right)}{q^3}$$

$$I_{shell} = 4\pi(\rho_{SEI} - \rho_{med})\left(\frac{\sin\left(\frac{D}{2}q\right) - \frac{D}{2}q\cos\left(\frac{D}{2}q\right)}{q^3} - \frac{\sin\left(\frac{d}{2}q\right) - \frac{d}{2}q\cos\left(\frac{d}{2}q\right)}{q_3}\right)$$

In order to perform this calculation we first need to determine the size of the lithiated core-shell nanoparticles. To do this, we converted the capacity of the first lithiation to the number of electrons that flowed in the cell and assumed that each electron produced one Li+. Then, using the grams of carbon black on each electrode and assuming that the carbon black lithiated to $C_6Li_{0.5}$, we calculated the amount of lithium entering the carbon black. Electrons generated during the 0.6 V to 0.1 V voltage range were assumed to contribute to SEI formation. The amount of Li+ lost to carbon black and to SEI formation was subtracted from the total amount of Li+, giving the amount of Li+ that lithiates the Si nanoparticles. The amount of the Li+ that lithiates the Si nanoparticles was used to find the number of lithiated Si atoms by assuming that the lithiated phase formed is $Li_{13}Si_4$.

Given that the average nanoparticle size is 100 nm, each Si nanoparticle was assumed to have a diameter of 100 nm. We calculated the number of Si atoms in a 100 nm nanoparticle using the density of crystalline Si, $6.86\times10^{23}$ electrons/cm³. We determined the total number of silicon atoms on an electrode using the mass of Si on the electrode. By dividing the total number of Si atoms on the electrode by the number of Si atoms per nanoparticle, we found the number of Si nanoparticles on the electrode. Then by dividing the number of lithiated Si atoms by the number of Si nanoparticles, we determined the number of lithiated Si atoms per nanoparticle. This value was subtracted from the number of Si atoms per nanoparticle to find the number of unlithiated Si atoms per nanoparticle. The unlithiated Si atoms include the core of the core-shell particle, and the lithiated Si atoms make up the shell of the core-shell particle.

Using the density of $Li_{13}Si_4$ and the number of lithiated Si atoms per nanoparticle, the volume of the $Li_{13}Si_4$ shell was found. The volume, and subsequently the diameter d, of the unlithiated Si core were calculated using the number of unlithiated Si atoms per nanoparticle and the density of crystalline Si. By finding the total volume of the core-shell particle, the unlithiated Si core plus the $Li_{13}Si_4$ shell, the diameter, D, of the entire particle can be determined.

In summary, X-ray scatter imaging, SFHI, is an effective, nondestructive operando method to study Li-ion cells. X-ray scatter imaging shows that the SEI does not form uniformly across the electrode and this contributes to the electrode not lithiating uniformly. This result indicates that techniques such as Atomic Force Microscopy (AFM), Scanning Electron Microscopy (SEM), and Small Angle X-ray Scattering (SAXS), which only allow for an observation of a small area of the electrode during a measurement, provide data that are not necessarily representative of an entire lithium-ion cell. The present invention shows that SEI formation directly impacts the performance of the electrode during later cycles and that there is a direct relationship between anomalous SEI formation and low capacity cells. The imaging modality may be used to determine how the SEI formation can be better controlled so that all lithium-ion cells can be high capacity cells and so that all regions within a single cell can be high performance. Using SFHI, one can observe the formation of core-shell nanoparticles during the first lithiation. Electron density of the nanoparticles remain nearly constant during delithiation, which suggests that the SEI is entering in the nanoparticles during delithiation and is contributing to a constant electron density. SEI penetrating into the nanoparticles may be a significant contributor to the rapid capacity loss that Li-ion batteries with Si anodes experience, and this observation is subsequently an important step in understanding and preventing rapid capacity loss. SFHI of Li-ion cells has the unique ability to take nondestructive images of the entire electrode in real time as the cell is cycling without the need to modify the cell. These characteristics enable SFHI to study inhomogeneities within the cells with regards to SEI formation and lithiation and delithiation behavior. A SFHI image provides comprehensive information about how the cell will perform and thus an invaluable tool in developing high performance and safe Li-ion cells. The present invention may also be readily applied to other promising anode materials (e.g., Bi, Mg) and types of batteries (e.g. Li-metal).

As shown in FIG. 2, a process 100 for in-situ x-ray scatter imaging of cell components includes providing (11) a Spatial Frequency Heterodyne Imaging system and providing (120) a grid.

Process 100 provides (130) a cell.

Process 100 generates (140) X-rays from the Spatial Frequency Heterodyne Imaging system that pass through components of the cell and the grid.

Process 100 detects (150) a scatter image from the X-rays

The grid can include stainless steel wires with uniform spacing. The cell can be a Li-ion battery, a metal-metal-oxide battery, a metal polymer battery, a fuel cell, a chemical reactor including one or more surfaces covered with heterogeneous catalysts, and so forth. The cell may be positioned before or after the grid.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:
    providing a Spatial Frequency Heterodyne Imaging system;
    providing a grid;
    providing a cell, wherein providing the cell comprises charge cycling of the cell;
    generating X-rays from the Spatial Frequency Heterodyne Imaging system that pass through components of the cell and the grid; and
    detecting a scatter image from the X-rays.

2. A method comprising:
    providing a Spatial Frequency Heterodyne Imaging system;
    providing a grid;
    providing a cell, wherein the cell is a chemical reactor including one or more surfaces covered with heterogeneous catalysts undergoing chemical transformations;
    generating X-rays from the Spatial Frequency Heterodyne Imaging system that pass through components of the cell and the grid; and
    detecting a scatter image from the X-rays.

* * * * *

UNITED STATES PATENT AND TRADEMARK OFFICE
CERTIFICATE OF CORRECTION

PATENT NO. : 10,833,374 B2  
APPLICATION NO. : 15/803458  
DATED : November 10, 2020  
INVENTOR(S) : Christoph Rose-Petruck et al.

Page 1 of 1

It is certified that error appears in the above-identified patent and that said Letters Patent is hereby corrected as shown below:

On the Title Page

(72) Inventors:  
Replace "Francicso"  
With --Francisco--.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*